United States Patent [19]
Irlbacher et al.

[11] Patent Number: 4,800,772
[45] Date of Patent: Jan. 31, 1989

[54] LOCKING PLATE FOR GEAR CHANGE RODS

[75] Inventors: Wolfgang Irlbacher, Eriskirch; Gerhard Buri, Friedrichshafen, both of Fed. Rep. of Germany

[73] Assignee: Zahnradfabrik Friedrichshafen, AG, Friedrichshafen, Fed. Rep. of Germany

[21] Appl. No.: 93,747
[22] PCT Filed: Nov. 26, 1986
[86] PCT No.: PCT/EP86/00681
§ 371 Date: Aug. 4, 1987
§ 102(e) Date: Aug. 4, 1987
[87] PCT Pub. No.: WO87/03714
PCT Pub. Date: Jun. 18, 1987

[30] Foreign Application Priority Data
Dec. 6, 1985 [WO] PCT Int'l Appl. ............ PCT/EP85/00680

[51] Int. Cl.$^4$ ............................................. G05G 5/10
[52] U.S. Cl. ........................................................ 74/477
[58] Field of Search ............................ 74/477, 483 PB

[56] References Cited

U.S. PATENT DOCUMENTS

| | | | |
|---|---|---|---|
| 1,410,116 | 3/1922 | Pomeroy | 74/477 |
| 1,537,584 | 5/1925 | Carhart | 74/477 |
| 1,601,048 | 9/1926 | Sponable . | |
| 1,719,520 | 7/1929 | Reville . | |
| 2,748,910 | 6/1956 | Klecker . | |
| 3,292,451 | 12/1966 | Jacklin et al. . | |
| 4,633,729 | 1/1987 | Scalisi et al. | 74/477 |
| 4,633,730 | 1/1987 | Scalisi et al. | 74/477 |

FOREIGN PATENT DOCUMENTS

| | | | |
|---|---|---|---|
| 1016997 | 10/1957 | Fed. Rep. of Germany . | |
| 8122318.8 | 10/1981 | Fed. Rep. of Germany . | |
| 56-85124 | 7/1981 | Japan | 74/477 |
| 9947 | of 1911 | United Kingdom . | |
| 58 | of 1914 | United Kingdom | 74/477 |

OTHER PUBLICATIONS

"Repair Instructions for ZF Synchroma Gearing", pp. 1 and 22, date unknown.

Primary Examiner—Lawrence Staab
Attorney, Agent, or Firm—Zalkind & Shuster

[57] ABSTRACT

A plurality of control rods (41, 43, and 42, 44) extend transversely of a locking plate (3) through which at least three of the control rods are locked in a neutral position by cammed displacement of the locking plate in response to axial displacement of another of the control rods from the neutral position. Locking grooves (45) in the control rods are aligned in the neutral position and the rods are engaged therein by locking edges (31, 32) formed on the locking plate facing opposite directions for either cammed displacement of the locking plate or locking of the rods. The locking plate is displaceable within a housing (11) along a path transverse to the control rods and about a pivot axis (52) fixed to the housing.

14 Claims, 3 Drawing Sheets

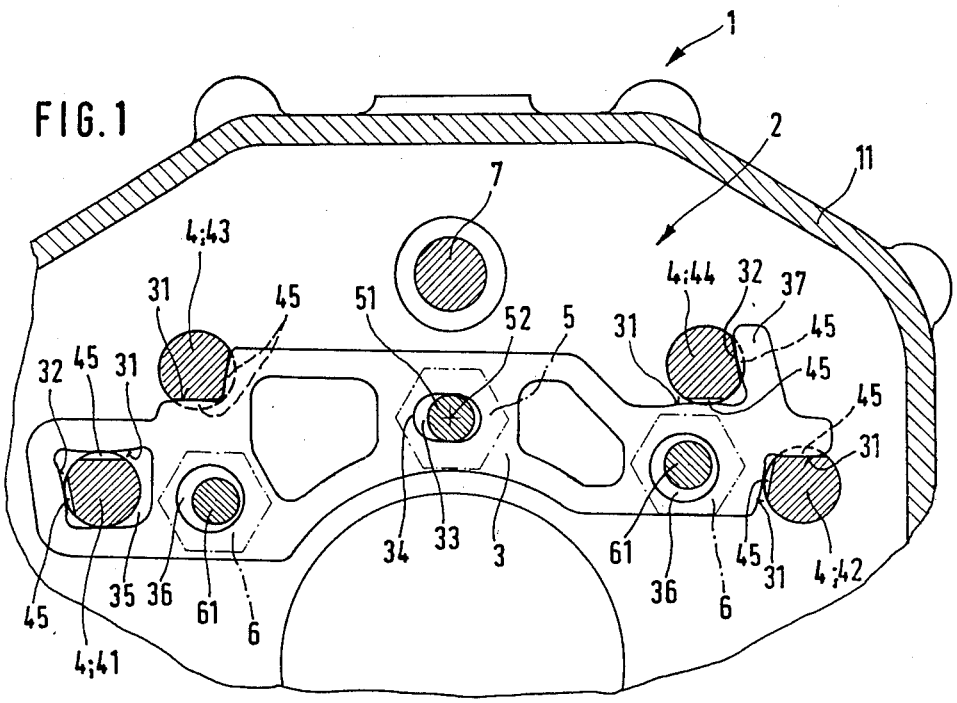

LOCKING PLATE FOR GEAR CHANGE RODS

BACKGROUND OF THE INVENTION

It has been known to make provision in the case of gear-change gearings for their protection to insure that always only one gear is engaged. Thus, only one of the control or shifting rods which are in connection or in active connection for the shifting of gears or shift couplings with shifting forks or selector forks, is shifted out of the neutral position while the remaining control rods assigned to the gears (not shifted) of the other gates are locked in the neutral position.

The best known locking arrangements consist of the control rods provided with stop grooves or bores with locking bodies being under the force of springs and disposed transversely thereto in bores in the gear housing. Such arrangements, however, make sense only when the control rods, as can be gathered from the German AS No. 10 16 997 or the German Utility Patent No. 81 22 31.8, lie relatively close together in one plane.

In the case of modern gearings wherein the control rods are disposed according to their main function and thus in the upper gear space, it has also already been known—ZF-Synchroma Gearing, pages 5-16 (G 10 48 R-KB 11/83 d) FIG. 39, to use a locking plate in a locking arrangement. With such a locking plate, however, it is possible to lock only maximally two additional control rods by one control rod which will not be sufficient for gearings having more gears which are not to be engaged or shifted with an HH gearing.

SUMMARY OF THE INVENTION

Therefore, it is the task of the invention to further develop a locking arrangement wherein more than two gates can be locked.

While the locking plate according to the status of the prior art is only shifted during the change of the gates, the locking plate according to the invention may be shifted or swiveled around a rotary point or else shifted and swiveled. As a result, it will be possible to lock with one control rod more than two additional control rods by way of the locking plate in the neutral position.

Whenever additionally locking edges are disposed on the locking plate in such a way that they point in the direction toward the swiveling point, the shiftability and swivel movement of the locking plate will be increased and the locking of the control rods not participating in the shifting will be facilitated.

The dimensioning of an elongated hole in the locking plate also serves the same goal, because the extension thereof lies in the direction of the control rods and the guidance on the guide bolt takes place without clearance in the other direction, displaced therefrom by 90°, so that it is possible to effect the shifting of the locking plate by way of small paths. In connection with two locking edges per control rod which also act as guide edges, especially a swiveling movement of the locking plate will be facilitated. Except for the contact of the guide bolt in one direction in the elongated hole, no additional contact develops between the holding screws and the locking plate since the latter is shifted and swiveled exclusively always by one control rod and is held by all the remaining control rods in each of the positions assigned to the selected gates.

Whenever the locking plate is made with openings for individual shifting rods, two locking edges per shifting rod may well be arranged, of which one is also to point toward the rotary point. A particularly simple solution will be achieved, whenever the guide bolt is a component of a holding screw, because three holding screws over the entire extent of the locking plate allow a double function of this holding screw to be achieved.

Whenever the locking plate is to be disposed in the area of a housing cover, then instead of the attachment by way of holding screws, the positioning in a recess which is closed by a lid may be a simple solution.

Further details of the invention will be explained on the basis of embodiments by way of examples and drawings.

BRIEF DESCRIPTION OF THE DRAWINGS

FIG. 1 shows the locking arrangement in the gear housing with the locking plate in a front view;

FIG. 2 shows a top view of the locking plates;

DESCRIPTION OF THE PREFERRED EMBODIMENT

Figure 3:
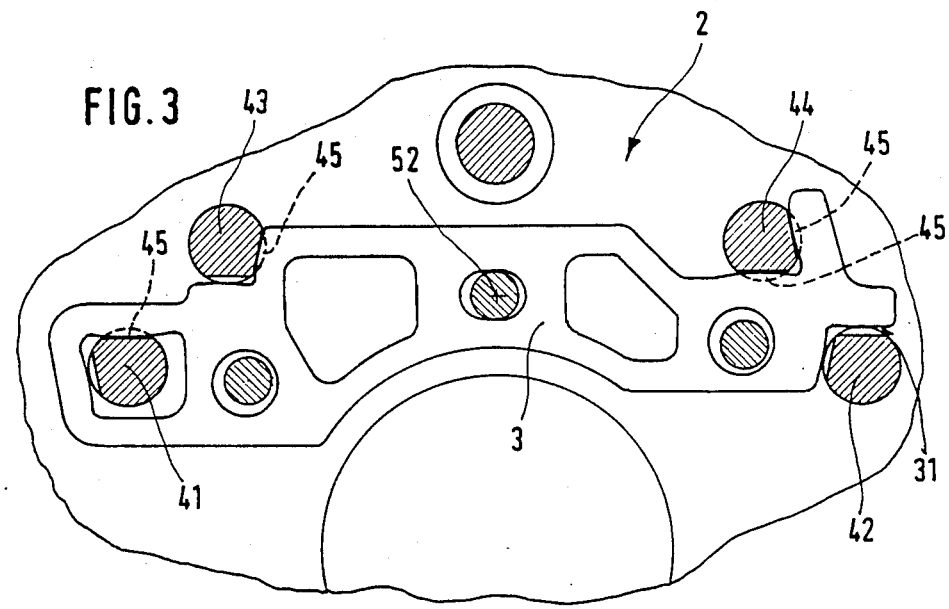
FIGS. 3-5 show further positions of the locking plate.

FIG. 1 shows a partial section cut transversely through the gear-change gearing 1 in the area of four control rods 4-41 to 44—and of the locking plate 3 which is held by way of the holding screws 6 with little play on the gear housing 11. The openings 36 in the locking plate are dimensioned at such a size that in no position of the locking plate 3 do they come into contact with the shaft 61 of the adjacent holding screw 6. The locking plate 3 extends in the direction ofthe control rods 41 to 44 and has an elongated hole 33 extending in the same direction between two control rods 41, 43 and 42, 44 approximately in the middle and may be swiveled or shifted around a guide bolt 51 which is attached in the gear housing 11 and extends through the elongated hole 33. The guide bolt 51 may also be part of a third holding screw 5.

The delimitation 34 in the longitudinal direction of the elongated hole 33 is dimensioned such that the adjustment of the locking plate 3 is not impeded by the control rods 4. The control rods 41 to 44 have at least in the area of the locking plate 3 locking grooves 45 which are assigned to the neutral position of the control rods 41 to 44. The number 7 designates the selection and shifting shaft in active contact with the shifting lever, not shown. The shaft 7 transmits the selecting and shifting movement in a known manner to the control rods 41 to 44. The locking plate 3 has locking edges 31 and 32, whereby the locking edges 31 are disposed in a known manner pointing to the outside upwardly or downwardly. The locking edges 32 on the other hand point inwardly and are disposed in the area of an opening 35 or of a projection 37.

In the top view of the locking plate 3 according to FIG. 2, the numeral 11 designates the gear housing in which the selection and shifting shaft 7, the control rods 41 to 44 are mounted and the locking plate 3 is held by holding screws 6, 5.

Figure 4:
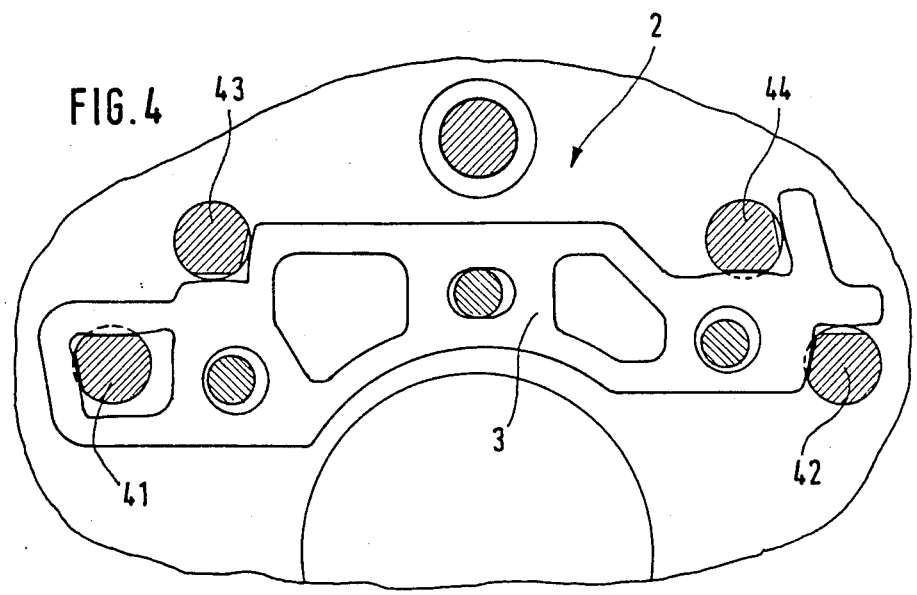
Figure 5:
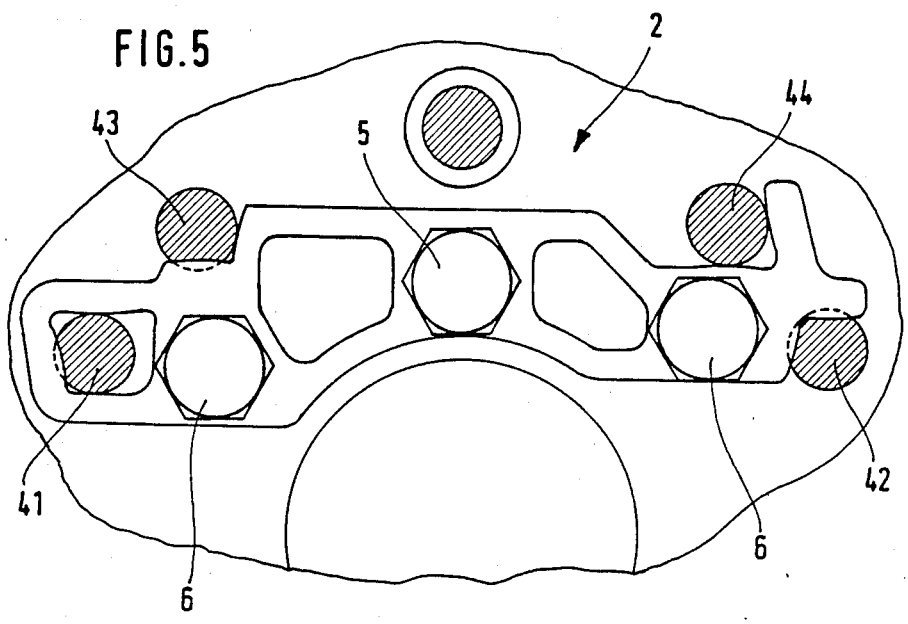

FIGS. 3 to 5 show schematically the additional positions of the locking plate 3 as they result from the position of the control rods 41 to 44 in the pertinent positions of the gates.

Figure 6:
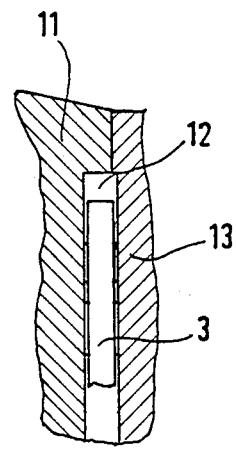
FIG. 6 shows a portion of the locking plate in a recess in the gear housing.

In FIG. 6, an arrangement of the locking plate 3 is shown in a recess 12 in the gear housing 11 which is meaningful whenever the gear-change gearing 1 has a gear closing lid 13 in this area.

The locking arrangement 2 operates as follows:

In FIG. 1, the locking plate 3 is shown in the position in which the control rod 41 of the gears 1 and 2 is shifted out of the neutral position into one of the gears 1 or 2. By way of the locking edges 31 and 32 in the opening 35 and the full diameter of the control rod 41—therefore outside of the locking grooves 45—, the locking plate 3 at the same time is held in a left-hand position, and in relation to the left-hand side of the locking plate 3, a lower end position. At least one of the locking edges 31, 32 cooperating with each control rod 41 to 44 lock in this position the other control rods 42 to 44 of the gears 3, 4; 5, 6 and R by way of the locking grooves 45 in the neutral position. Only when the shifting rod 41 is again guided out from one of the gear terminal positions of the gears 1 or 2 into the neutral position, will it be possible to shift one of the other control rods 42 to 44 for engaging a gear.

In the position of the locking plate 3 shown in the FIG. 3, one of the gears 3 or 4 is engaged and thus the control rod 42 is no longer in the neutral position. The locking edge 31 has been forced upwardly by the control rod 42 so that in the left-hand end position of the locking plate 3, one more turn around the rotation or swiveling point 52 has resulted. In this position the control rods 41, 43 and 44 are held firmly by way of at least one of the locking edges 31, 32 in the locking grooves 45.

FIG. 4 shows the shifted control rod 43 and the locked control rods 41, 42, 44. The locking plate 3 at the same time has been forced into a right-hand end position by the shifting rod 43.

In FIG. 5, the control rod 44 has been moved out of the neutral position in the manner already described and the R-gear has been shifted and the control rods 41, 42 and 43 may not be shifted. The locking plate 3 assumes a right-hand position and related to the right half, a lower end position. Additionally, the holding screws 5 and 6 are indicated in this figure, such that locking plate 3 is held in an axial direction by these screws, whereby only a bolt or shaft of the holding screw 5 has a guide function for the shifting or rotating and swiveling movement of the locking plate 3. The shifting-, rotating- or swiveling movement or else superposed shifting and swiveling movement of the locking plate is caused exclusively by the pertinent control rods 41 to 44 moved out of the neutral position, whereby the remaining control rods 41 to 44 support the locking plate 3 in their locking grooves 45.

We claim:

1. In combination with the plurality of control rods (4) constrained to axial displacement from a neutral position in which locking grooves (45) therein are aligned within a housing (11), locking means (2) responsive to displacement of one of the control rods from the neutral position for locking the other of the control rods in the neutral position, including a locking plate (3) within the housing engageable with the control rods within said grooves therein, the improvement comprising means (51-33) mounting the locking plate for displacement along a path extending transversely of the control rods and about a pivot axis (52) fixed to the housing in intersecting relation to said path, said plurality of control rods including at least two pairs of the control rods (41, 43 and 42, 44) respectively disposed on opposite sides of the pivot axis along said path and means (31,32) responsive to said displacement of the one of the control rods for camming the locking plate into locking engagement with the other of the control rods, said latter means including two locking edges (31,32) on the locking plate engageable with each of said pairs of the control rods within the grooves therein.

2. The combination of claim 1 wherein said plate mounting means (51-33) includes a guide bolt (51) through which said pivot axis is established and an elongated hole (33) formed in the locking plate through which the guide bolt extends.

3. The combination of claim 2 wherein said guide bolt (51) has a sliding fit dimensional relationship to the elongated hole (33) accommodating said camming of the locking plate along the path.

4. The combination of claim 3 wherein one of the two locking edges (31) faces toward the pivot axis.

5. The combination of claim 4 wherein the locking plate has at least one opening (35) through which at least one of the control rods is guided and forming said two locking edges (31, 32).

6. The combination of claim 5 including an axial stop (5) connected to the guide bolt (51) limiting axial displacement of the locking plate relative to the control rods.

7. The combination of claim 6 including at least two additional guide shafts (61) extending through additional openings (36) formed in the locking plate and additional axial stops (6) connected to said guide shafts.

8. The combination of claim 5 wherein said housing (11) has a recess (12) formed therein, within which the locking plate (3) is disposed, and a lid (13) enclosing the locking plate within the recess.

9. The combination of claim 1 wherein one of the two locking edges (32) faces toward the pivot axis (52).

10. The combination of claim 2 wherein said guide bolt has a sliding fit dimensional relationship to the elongated hole (33) accommodating said camming of the locking plate along the path.

11. The combination of claim 1 wherein the locking plate has at least one opening (35) through which at least one of the control rods is guided and forming said two locking edges (31, 32).

12. The combination of claim 2 including an axial stop (5) connected to the guide bolt (51) limiting axial displacement of the locking plate relative to the control rods.

13. The combination of claim 12 including at least two additional guide shafts (61) extending through additional openings (36) formed in the locking plate and additional axial stops (6) connected to said guide shafts.

14. The combination of claim 1 wherein said housing (11) has a recess (12) formed therein, within which the locking plate (3) is disposed, and a lid (13) enclosing the locking plate within the recess.

* * * * *